United States Patent
Frenger et al.

(10) Patent No.: US 8,229,451 B2
(45) Date of Patent: Jul. 24, 2012

(54) METHOD AND ARRANGEMENT FOR MANAGING INTER-CELL INTERFERENCE IN A COMMUNICATIONS NETWORK

(75) Inventors: Pål Kristian Frenger, Linköping (SE); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 203 days.

(21) Appl. No.: 12/598,134

(22) PCT Filed: Jan. 10, 2008

(86) PCT No.: PCT/EP2008/000193
§ 371 (c)(1),
(2), (4) Date: Mar. 24, 2010

(87) PCT Pub. No.: WO2008/135101
PCT Pub. Date: Nov. 13, 2008

(65) Prior Publication Data
US 2010/0203882 A1     Aug. 12, 2010

(30) Foreign Application Priority Data
May 2, 2007  (SE) ...................... 0701072

(51) Int. Cl.
*H04W 72/00*    (2009.01)
(52) U.S. Cl. .................... 455/452.2; 455/63.1
(58) Field of Classification Search .......... 455/69, 455/522, 450, 451, 452.1, 453, 452.2
See application file for complete search history.

(56) References Cited

U.S. PATENT DOCUMENTS
2005/0282550 A1 *  12/2005  Cho et al. .............. 455/447
2008/0004033 A1 *  1/2008   Tiedemann et al. .......... 455/453

FOREIGN PATENT DOCUMENTS
EP         1750407 A1     2/2007
WO    2007/145557 A1    12/2007

OTHER PUBLICATIONS

3rd Generation Partnership Project. "Options for Inter-cell Interference Coordination (ICIC)." 3GPP TSG-RAN WG3 Meeting #53, R3-061199, Tallinn, Estonia, Aug. 28-Sep. 1, 2006.
3rd Generation Partnership Project. "Downlink and Uplink Inter-cell Interference Co-oridination/Avoidcance—Impact on the Specifications." TSG-RAN WG1 Meeting #44, R1-060586, Denver, Colorado, USA, Feb. 13-17, 2006.

(Continued)

*Primary Examiner* — Tu X Nguyen
(74) *Attorney, Agent, or Firm* — Coats & Bennett, P.L.L.C.

(57) ABSTRACT

The present invention relates to a method in a base station (110a, 110b, 210a, 210b, 210c, 410a, 410b) for managing inter-cell interference in a communications network, comprising a scheduler in each cell which controls a set of shared radio resources, said radio resources being at least near orthogonal to each other. The method comprises the steps of: obtaining (601) data representing path gain measurements, obtaining (602) data representing a cell specific resource price from one or several interfered base stations, combining (603) said information into a user specific resource price value for each radio resource, calculating (604) a user specific weighted channel quality indication value for each radio resource by combining a channel quality indication (CQI) information available for each given user with at least a product of said user specific resource price and the required transmit power for each user, and making (605) a scheduling decision based on said user specific weighted CQI values.

11 Claims, 7 Drawing Sheets

OTHER PUBLICATIONS

3rd Generation Partnership Project. "On Inter-cell Interference Coordination Schemes without/with Traffic Load Indication." 3GPP TSG-RAN WG1 Meeting #49, R1-072456, Kobe, Japan, May 7-11, 2007.

Li, G. et al. "Downlink Radio Resource Allocation for Multi-Cell OFDMA System." IEEE Transactions on Wireless Communications, vol. 5, No. 12, Dec. 2006, pp. 3451-3459.

* cited by examiner

METHOD AND ARRANGEMENT FOR MANAGING INTER-CELL INTERFERENCE IN A COMMUNICATIONS NETWORK

TECHNICAL FIELD

The present invention relates to an infrastructure arrangement and method for use in a cellular radio system in which a scheduler in each cell controls a set of shared radio resources and also may coordinate their operation.

BACKGROUND

In the currently ongoing work of standardizing the long-term evolution (LTE) concept in 3GPP there have been numerous contributions on methods related to inter-cell interference coordination (ICIC).

Within the 3GPP working group RAN1 there has been a decision that the transmission of an "overload indicator" (OI) over the X2 interface (between base stations or eNodeBs) will be supported for the purpose of coordinating the interference between cells. No decisions have yet been taken on what this OI shall actually contain and how it should be used. The OI could be anything from a single bit to several bits per OFDM resource block. The transmission of the OI could be periodic or triggered by different events. In fact, it is not necessary that all aspects of the usage of the OI and the actual content of the OI (number of bits, information elements, etc) are subject to standardization.

Inter-cell interference management and inter-cell interference coordination has a vast literature, since the problem space is well known from, for instance, other cellular technologies, including GSM and EDGE. However, there is no distributed algorithm presented whose aim is to maximize overall throughput by avoiding collisions in a dynamic fashion. Semi-distributed algorithms for coordinated power and channel allocation have been proposed in the literature, see for instance [3][4].

Distributed algorithms for power control and interference management are well known. The scope of prior art does not easily extend to a multi-cell environment in which no central entity exists.

Multi-cell radio resource management in general and multi-cell interference management in particular also has a rich literature, although significantly less works have been done than for single cell systems. However, none of these works focus on what should be communicated between base stations in an orthogonal multi-cell system such that overall throughput approaches a near-optimal value. In fact, none of these algorithms focus on the case of distributed base stations and the communication between them.

The issue of dynamic distributed multi-cell interference management is well known and extensively discussed. However, apart from the overload indicator proposal, there has not been a specific proposal on X2 messages that have the goal to minimize the impact of interference caused by the different cells to one another. This is despite the fact that it has been indicated that such X2 message exchange is expected to enhance the overall system performance, see for example [1].

From a system development and from a standardization perspective, it is important to specify what messages between the base-stations should be communicated such that inter-cell interference management is efficiently achieved, see [5]. In fact, from that perspective, the actual inter-base station messages and (and how the contents of such messages can be constructed by the participating base stations) are more important than the algorithm that resides in each base station and dictates what the base station should do upon the receipt of such messages.

SUMMARY

Thus, the present invention seeks to solve or minimize the problem of inter-cell interference. Another problem is to devise the inter-base station information exchange (in for example LTE: X2 communication) and the associated base station algorithms such that requirements described below are met.

Consequently, the present invention provides a fully distributed solution for multi-cell orthogonal systems, including the inter base station information exchange such that the impact of inter-cell interference is minimized and thereby the overall system throughput is maximized. The prior art does not provided for such a system level engineering solution.

The problems are solved and the objectives are achieved using an infrastructure arrangement for use in a communications network, in which a scheduler in each cell of said network controls a set of shared radio resources, said radio resources being at least near orthogonal to each other. The arrangement comprises: a portion configured for receiving path gain measurements from at least one user equipment to an interfered cell, a portion configured for receiving cell information related to a specific resource value from one or several interfered base stations, a processing arrangement for combining said information into a user specific resource value for each radio resource, a calculating arrangement for calculating a user specific weighted channel quality indication value for each radio resource, and means for providing said scheduler with user specific weighted Channel Quality Indicator (CQI) values. Preferably, the scheduler is provided to use the user specific weighted CQI values to make a scheduling decision. The calculation combines a channel quality indication (CQI) information available for each given user with at least a product of a user specific resource price and the required transmit power for each user. Most preferably, the arrangement is arranged as a serving base station.

The invention also relates to a method in a base station for managing inter-cell interference in a communications network, comprising a scheduler in each cell which controls a set of shared radio resources. The radio resources are at least near orthogonal to each other. The method comprises the steps of: obtaining data representing path gain measurements, obtaining data representing a cell specific resource price from one or several interfered base stations, combining said information into a user specific resource price value for each radio resource, calculating a user specific weighted channel quality indication value for each radio resource by combining a channel quality indication (CQI) information available for each given user with at least a product of said user specific resource price and the required transmit power for each user, and making a scheduling decision based on said user specific weighted CQI values. Preferably, the path gain measurement is from at least one user equipment to interfered cells. The method may further comprise combining cell specific resource priority weights and resource restriction rules into the user specific weighted CQI values. Preferably, the weighted CQI (WCQI) is expressed as:

$$WCQI_{A1}(r) = RPW_A(r) + CQI_{A1}(r) - P_{A1}(r) \times RP_{A1}(r) + RR_{A1}(r;t),$$

wherein $WCQI_{A1}(r)$ is the weighted channel quality indicator for a user $A_1$ on resource r, $RPW_A(r)$ is the resource priority weights for the serving cell A, $CQI_{A1}(r)$ is the CQI values for user $A_1$, $P_{A1}(r)$ is a power used by user $A_1$, and $RR_{A1}(r,t)$ denotes resource usage restriction rules applicable for said user $A_1$ at time t.

The invention also relates to a method for calculating resource value that is provided by a first base station (A) to a second interfering base station (B). The method comprises the steps of: assigning cell specific resource priority weights (RPW) to each base station, estimating a current and an predicted load situation ($Load_A$), based on a measured load and said RPW, deciding which of the resources with lowest priority weights said first base station can provide with zero cost, and basing said cost on truncating a resource priority weight function to a width proportional to a load of said first base station (A) and scaling an area of a resulting function to a value proportional to a relative load ratio between said first base station and said second base station. Preferably, the assignment of cell specific resource priority weights (RPW) to each base station is executed either in a cell planning step or by a distributed or centralized method. Moreover, the truncated resource priority weight (TRWP) of said first base station is a function (f( )) of said RPW and $Load_A$. In one embodiment, the interference on resource blocks that are associated with zero cost is provided without resource consumption to one or several interfering base stations. Moreover, the resource cost that said first base station (A) provides to said second interfering base station (B) is a function (g( )) of said $TRPW_A$ and $Load_A/Load_B$, wherein Load B is load of said second base station (B). Preferably, the first base station provides different resource prices to different interfering base stations.

BRIEF DESCRIPTION OF THE DRAWINGS

The invention is described with reference to attached drawings, in which.

DETAILED DESCRIPTION

Figure 1:
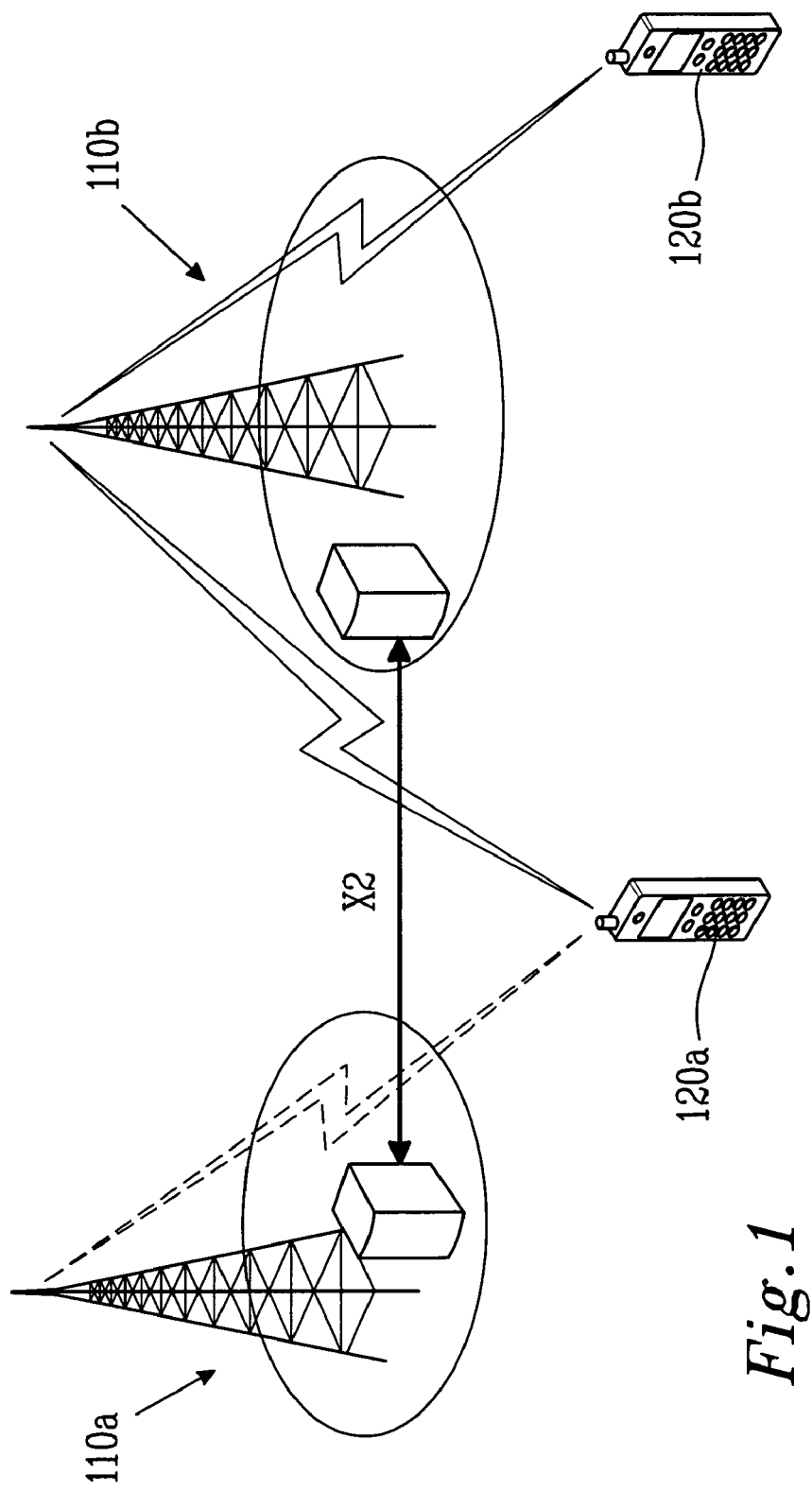
FIG. 1 illustrates a schematic cellular communication network with the notion of the resource block value.

For the purpose of the following description, some of the key requirements for the solutions according to the present invention are:

The information sent by every base station to its neighbours is such that the base station is able to construct those pieces of information based on own measurements, UE measurement reports and information obtained from other base stations. The necessary input from a central entity, such as an O&M system is minimized and confined to a significantly longer time scale than that of the interference variation and management.

The information exchanged between base stations may be limited to a number of a few bits per orthogonal unit (e.g. per resource block or channel). This is because the number of such units can be potentially high imposing transport overhead on the network interconnecting base stations.

The information that base stations need to exchange is possible to construct on a low time scale, essentially on the level of dynamic resource allocation that is on the level on which the packet scheduler works. This is essential, since in a packet (IP based) data network user both user data and interference situation typically operates on this time scale.

The information that base stations need to exchange provide sufficient input to base stations such that they can make scheduling and other resource allocation (e.g. queuing and power allocation, etc) decisions dynamically (in LTE, for instance, on a transmission time interval basis) such that overall system throughput is (nearly) optimized.

In the following, an ICIC method is described based on communication of ICIC related information between base stations. Although the focus is on an LTE system making use of an OI type of information exchange over the X2 interface, the invention is not limited to LTE: it could apply to any system where orthogonal, or near-orthogonal, radio resources are used. Throughout it will be assumed (not exclusively) orthogonal frequency division multiplexing (OFDM) and the associated concept of the OFDM resource blocks as the basic unit of such orthogonal radio resources.

Moreover, the description focuses on the uplink. The reason for that is that it is believed that the potential gains of an ICIC scheme are larger for the uplink than for the downlink. However, the method is equally applicable for the downlink.

Furthermore, the 3GPP term "overload indicator" is not used in the present description. Instead the more descriptive term "resource price" is used. The information that is transmitted between the base stations in the disclosed invention is not really related to "overload" but rather to the actual "load". The pieces of information communicated between the base stations can be easily translated to the overload indicator.

The "Weights Over X2" scheme does not try to prevent that an overload situation would occur (since it is not a load control scheme). It also provides the neighbours with little information about what to do. There is modest use of sending a message to a neighbouring base station states that "you are transmitting with high power on resource X" since the neighbouring base station already knows this. Furthermore, if the neighbouring base station tries to use another resource "Y" instead of "X" in response to receiving an overload indicator it might soon get a new overload indicator for the new resource "Y".

As it will be described in detail, the "Weights Over X2" scheme has the purpose of informing neighbouring base stations about the own "load" prior to the base station gets into an "overload" problem. The rationale for this is that based on this piece of information, the neighbouring base stations can try to put their respective load on other resources.

Furthermore, from the perspective of how much interference a resource tolerates without suffering quality degradation that is visible for higher layers, different resources have different importance. Typically some resources are primarily used for communicating with exterior users, far away from the base station, while other resources are primarily used for communication with interior users, close to the base station. Also in situations when the load is low, and not all resources are needed in a cell, it is possible to choose to primarily use some resources more often than others. Thus, the information that a resource used (i.e. it carries some load) is not sufficient.

The basic idea is that the base stations shall set a "resource price" or "resource value" on each resource that indicates the probability that the resource will be used as well as the interference sensitivity on that particular resource.

If a base station receives resource price information from the neighbours, it can make use of that information when deciding what resources to use for transmissions in the own cell.

Assume that each resource in each cell is associated with a resource priority weight (RPW). An RPW is assigned to each resource (in an OFDM system each resource corresponding to an OFDM resource block) either in a cell planning step or by some other distributed or centralized method.

In the uplink the "cost" of transmitting a signal from a UE is the interference this transmission causes to neighbouring base stations. In order to control this "cost" it is proposed that each eNodeB sets a "resource price" vector that is signalled to its neighbouring eNodeBs over the X2 interface. The difference between "cost" and "price" in this context should be noted. A resource has a "price" even if it is not used but there is a "cost" associated with transmitting power on a resource.

FIG. 1 shows the notion of the resource block price as a core element in the "Weights over X2" scheme. Essentially, the price of a resource block depends on the probability that the resource block is used and "how disturbing" it is when is used. In the network 100 of FIG. 1, two base stations 110a and 110b are illustrated communicating with UEs 120a and 120b. The base stations communicate through X2 interface.

In uplink UE 120a causes interference to the neighbouring base station, eNodeB (eNB) 110a. Thus, the resource scheduler (incorporated in the controller of the eNB) is discouraged to take resource blocks into use that are:

a. used by the neighbour (which is used with the high probability)

b. are close to the neighbour eNB.

So called resource block price or value is constituted of a and b.

In the downlink eNB 110a causes interference (indicated with hatched connections) to the UE 120a in the neighbouring cell. Thus, eNB 110a has an interference "budget" (i.e. margin) that is proportional to its current load.

Thus, the basic concept of the invention is to maximize total system throughput by minimizing the mutually caused interference to one another in a multi-cell environment. This objective is reached relying on two aspects:

Each base station calculating and announcing to its neighbours the resource block prices, and Each base station calculating the cost of using its own resources and minimizing its own total cost (subject to the constraint that users must be served at a given rate). This is achieved by a scheduler operation that governs the resource block usage in each cell.

The base station may comprise a processor for calculating a resource block price, a transmitter for transmitting the calculated resource block price and processor for calculating a cost of using its own resources and minimizing its own total cost and a scheduler arrangement governing a resource block usage in each cell.

Figure 2:
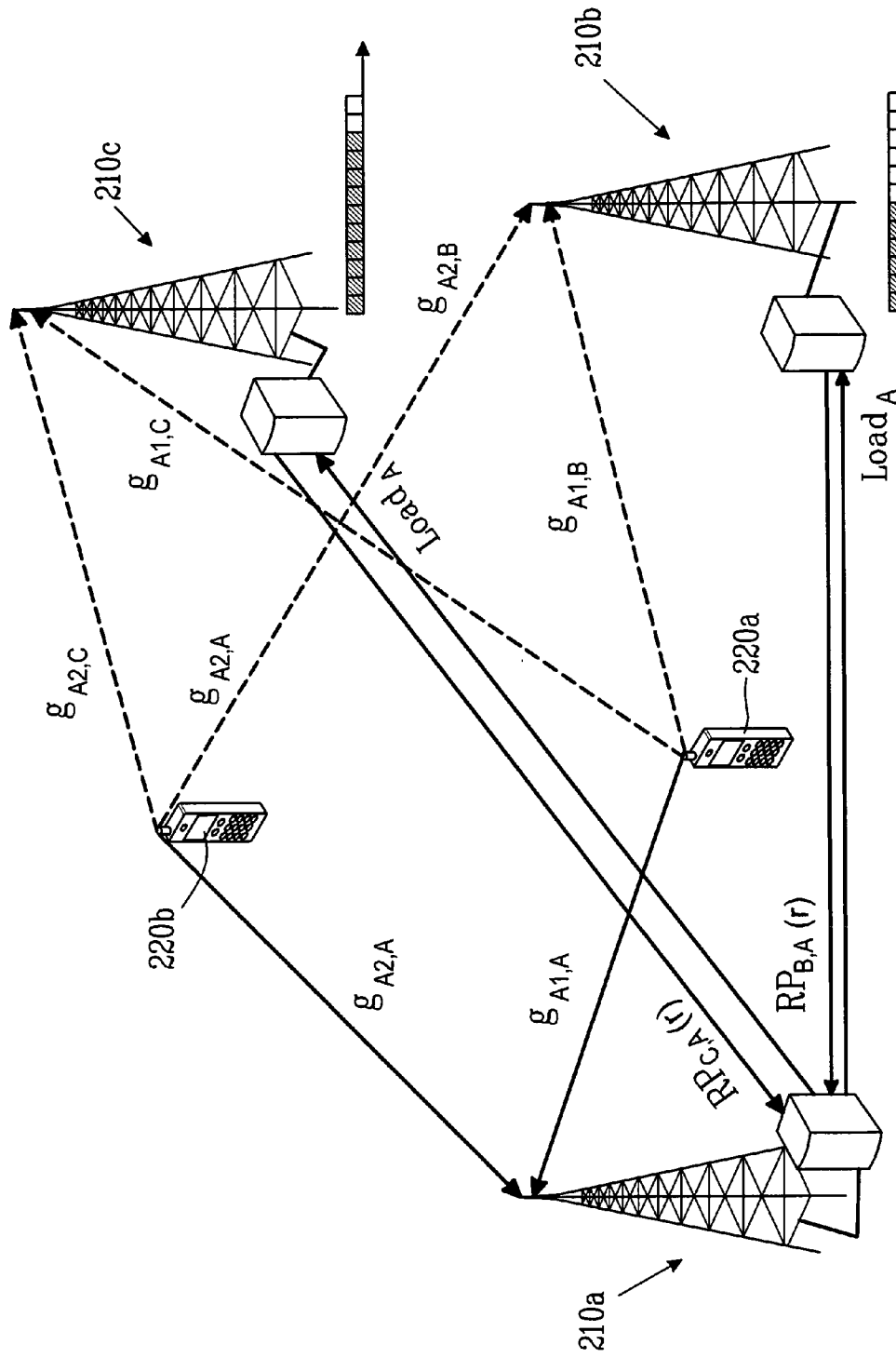
FIG. 2 shows schematically a network with base stations serving two user equipments.

FIG. 2 shows three eNBs 210a, 210b and 210c. eNB 210a serves two UEs 220a and 220b. The eNB 210a receives resource price (RP) information on each resource from the disturbed eNBs 210b and 210c. The serving eNB 210a also receives path loss estimates from the UEs 220a and 220b to the eNBs 210b and 210c.

The following notations are used:

$RP_{B,A}(r)$ is the price of resource r signalled from eNB 210b to eNB 210a.

$RP_{C,A}(r)$ is the price of resource r signalled from eNB 210c to eNB 210a.

The problem of how these resource prices (the RP values per resource block as indicated in FIG. 2) vectors are calculated is addressed below. Here, it is assumed that they are made available to the interfering eNB.

The chain of squares under each eNB represent resource blocks; empty squares represent resources with high priority (provided with high price to neighbouring eNBs) and hatched squares represent resources with low priority (provided with low price to neighbouring eNBs).

Each UE reports gain measurements to its serving eNodeB:

UE 220a reports $g_{A1}=[g_{A1,B}, g_{A1,C}]$ to eNB 210a

UE 220a reports $g_{A2}=[g_{A2,B}, g_{A2,C}]$ to eNB 210a

Note that these UE measurements and associated measurement reports are needed anyway in order to support handover decisions. Other measurements needed for scheduling in the serving cell are not addressed here (e.g. UE 220a reports a channel quality indicator for each resource block r, $CQI_{A1}(r)$, to eNB 210a).

The scheduler in eNB 210a can now calculate the resource price for UE 220a ($RP_{A1}(r)$) and UE 220b ($RP_{A2}(r)$) as:

$$RP_{A1}(r)=RP_{B,A}(r)\times g_{A1,B}+RP_{C,A}(r)\times g_{A1,C}$$

$$RP_{A2}(r)=RP_{B,A}(r)\times g_{A2,B}+RP_{C,A}(r)\times g_{A2,C}$$

Thus each user has an individual resource price vector that depends on the actual radio position the user has in relation to the serving and the interfered cells.

The scheduler in the base station can now calculate the cost associated with transmission of power from the different UEs. The cost ($C_A(r)$) of assigning, e.g. the power vector $P_{A1}(r)$ and $P_{A2}(r)$ to UE 220a and UE 220b, respectively, in eNB 210a can be calculated as:

$$C_A(r)=RP_{A1}(r)\times P_{A1}(r)+RP_{A2}(r)\times P_{A2}(r)$$

The total cost of a power assignment (scheduling decision) for eNB 210a is the sum of the cost over all radio resources:

$$C_A=\Sigma_r C_A(r)$$

The signalled resource price vectors are a function of the load. The load measure may not only depend on how much traffic there is in a cell, but also on the importance of the traffic. In order to support QoS (quality of service) it is typically desired to differentiate between GBR (guaranteed bit rate) traffic and BE (best effort) traffic. This can be done by associating a priority value for each data flow. Thus the load in eNB 210a ($Load_A$) may be expressed as a priority weighted sum of the traffic load, e.g.:

$Load_A=\Sigma_f flowPriority_f \times bufferSize_f$, summed over all flows $f$.

The above equation is actually an oversimplification. E.g. it does not take into account the bit rates of the different flows and it does not do any time domain averaging. But for the purpose of describing the disclosed ICIC invention it is sufficient to leave those details out and say that there will be a well defined method of calculating a load measure that is applicable in each cell.

In case of low load more resources shall be made available at low (or zero) price in neighbouring eNBs. The calculation of the resource price from eNB 210a to eNB 210b should be based on:

Resource priority weights in eNB 210a: $RPW_A(r)$

The load measures $Load_A$ and $Load_B$ (load for eNB 210b).

Figure 3:
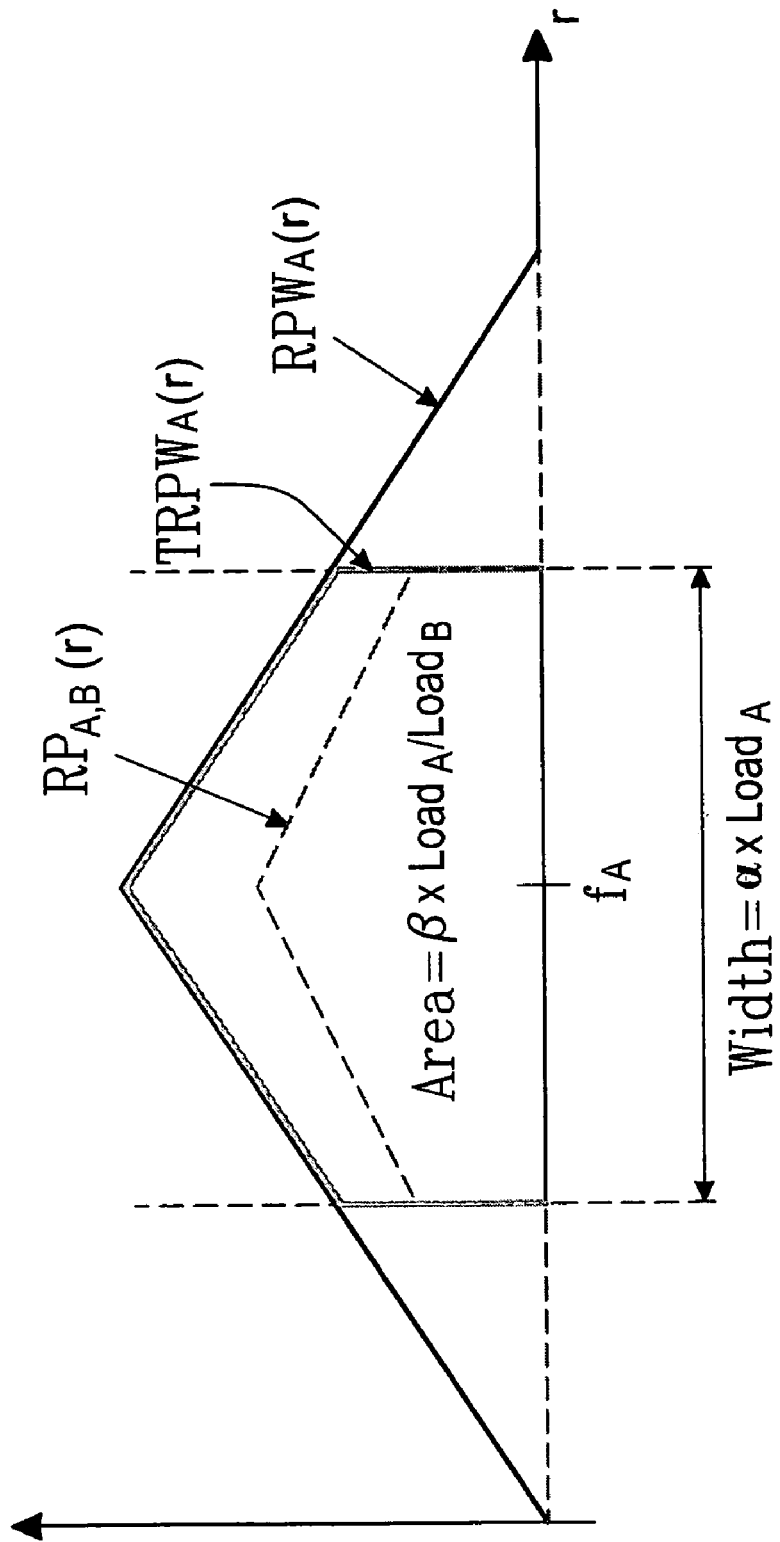
FIG. 3 illustrates schematically a graph used for calculating resource price vector according to the invention.

FIG. 3 illustrates schematically a graph for use in a method for calculating the resource price vector according to the invention. The RPW vector is truncated to a width proportional to the estimated (non priority weighted) load in the cell. Then the resource price is calculated by scaling the TRPW to an area proportional to the ratio of the (priority weighted) loads of the serving and interfering cells respectively.

It is further proposed that an eNB 210a (FIG. 2 with same notations as above) determines the resource price for another eNB 210b as a truncation and/or scaling of $RPW_A(r)$ to an area proportional to the ratio $Load_A/Load_B$.

The resource price vector may be efficiently signalled by a few parameters (e.g. $f_A$, Width, and Area) instead of 2-3 bits per resource block.

Note that with truncation of the RPW vector is meant that the eNB may determine if some of the resource blocks can be given the price zero for all base stations. The eNB may try to determine the probability that a resource will be unused for in the near term future. If this probability is below a threshold then the price of the corresponding resources can be set to zero. In this truncation step a non-priority weighted load measure may be used.

For the resources that will be given non-zero price different price levels to different base stations may be set. A base station will provide lower resource prices to a base station with high load than to another with lower load.

The maximum allowed cost in eNB 210a, $C_{max,A}$, may also be limited by a weighted load measure where $$C_{max,A} = \alpha \times Load_A,$$

where $\alpha$ is a constant factor.

The uplink scheduler in a serving eNB 210a will try to minimize the total interference cost summed over all UEs i and resources r when making its scheduling decision. The optimum solution to this problem requires an exhaustive search over all possible scheduling decisions, which is prohibitively complex. Instead, other sub-optimum solutions must be used.

Nevertheless, any good scheduling algorithm should take into account both the channel quality indication (CQI) information as well as the cost of assigning different resources to different users. In order to achieve this each radio resource for $UE_{A1}$ may be weighted in the scheduler as $$WCQI_{A1}(r) = RPW_A(r) + CQI_{A1}(r) - P_{A1}(r) \times RP_{A1}(r),$$

where $RPW_A(r)$ is the resource priority weight used in eNB 210a, $CQI_{A1}(r)$ is the CQI reported from UE 220a on resource r. By this the scheduler will avoid to assign resources to $UE_{A1}$ that are expensive in $UE_{A1}$. Note that the cost of assigning a particular resource to different users is typically different. Assume there are two different users that are both located on the edge of the serving cell. These two users will typically be interfering differently into the neighbouring cells. The scheduler can be made aware of this and it is discouraged to schedule UEs on resource blocks that will cause "expensive" UL interference in neighbouring sites.

The scheduling cost of a resource is thus the product of the resource price, the power and the radio distance. The cost function is therefore such that it will tend to assign resource blocks to a UE with high power only if The UE has large radio distance to sites where this resource is expensive.
The resource has a low price in sites in close radio distance to the UE.
The base station has a higher (priority weighted) load than its neighbours.

In case there is a greedy scheduler that schedules one user at a time and assigns the resources with the largest weighted channel quality indications to each user then it is important that the users that generate the highest cost are allowed to select resources first. The scheduler could give a scheduling bonus to power limited (exterior) users so that they are scheduled before any non power limited (interior) users. The scheduler can sort the users according to the geometry factor (defined e.g. as the ratio of the gain to the serving cell and the sum of the gains to all interfering cells) so that users with low geometry get to select radio resources first.

Figure 4:
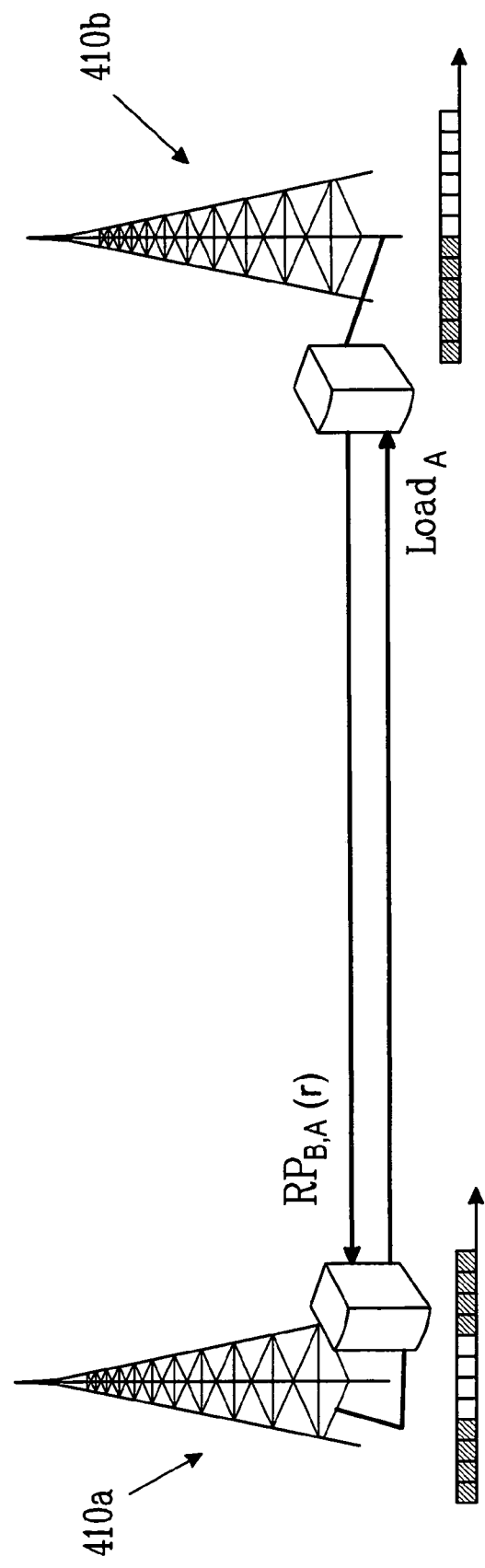
FIG. 4 illustrates schematically information exchange between base stations according to one aspect of the invention.

FIG. 4 illustrates schematically information exchange between eNBs according to the invention. In this example the interfered eNB 410a sets the resource price, but given sufficient information the interfering eNB 410b could also calculate the resource price.

The required signalling between the base stations (over the X2 interface) is depicted consists of:
  Resource price vectors (infrequent, event triggered).
  Weighted load reports for resource price calculations (infrequent, event triggered).

Note that the information exchange can be designed and encoded in many different ways. It is however not the purpose of this invention to make claims on information exchange between the eNBs, but rather to propose a solution that enables the eNBs to use the information they can obtain from the neighbouring eNBs.

Figure 6:
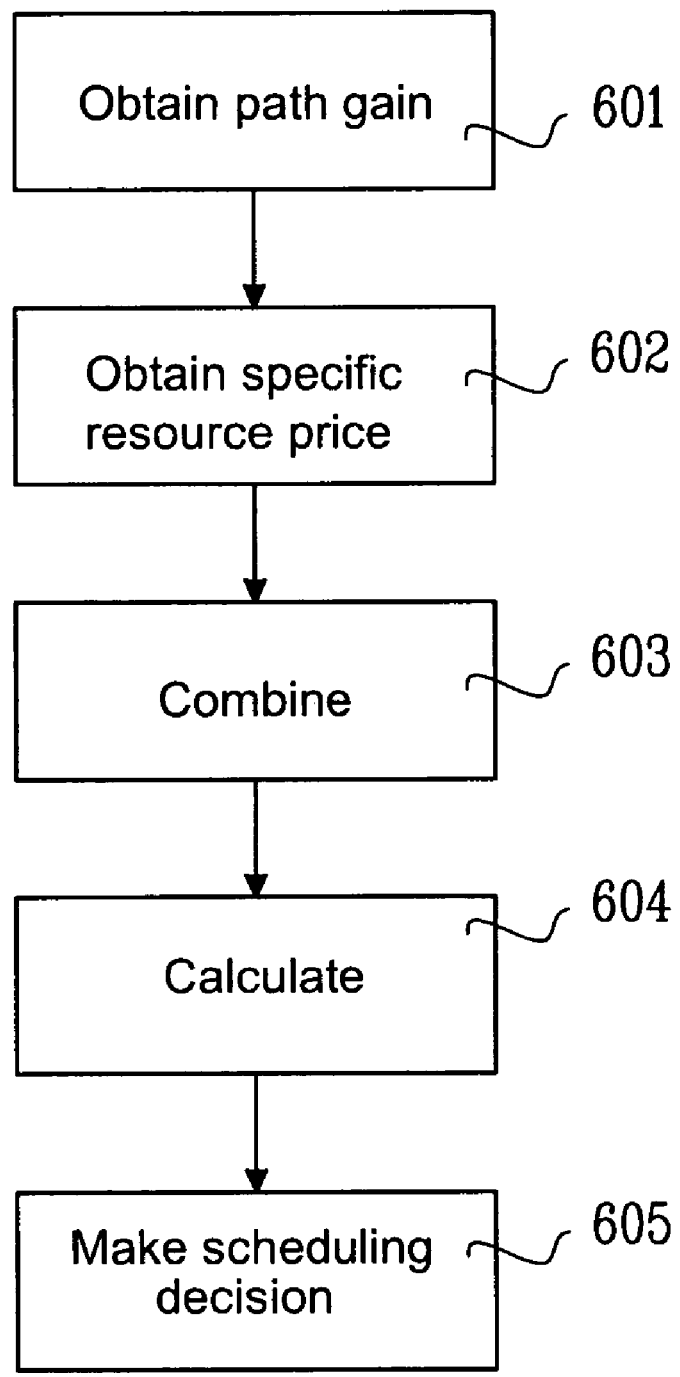
FIG. 6 is a schematic flow diagram illustrating steps of a method according to the present invention.

To summarize, the invention according to one aspect relates to a method for managing inter-cell interference in a cellular radio system in which the scheduler in each cell controls a set of shared radio resources, where the radio resources are at least near orthogonal to each other. The method comprises the steps of (FIG. 6):
  The serving eNB obtains 601 path gain measurements from at least one UE to the interfered cells,
  The serving eNB obtains 602 cell specific resource price related information from one (or several) interfered eNB(s),
  The serving eNB combines 603 this information into a user specific resource price value for each radio resource,
  The serving eNB calculates 604 a user specific weighted channel quality indication value for each radio resource by combining the channel quality indication (CQI) information available for each given user with (at least) the product of the user specific resource price and the required transmit power for each user,
  The scheduler uses the user specific weighted CQI values to make 605 a scheduling decision.

Also other factors known in prior art, e.g. cell specific resource priority weights as well as various resource restriction rules may be combined into the user specific weighted CQI values. This can be expressed (assuming proper scaling of the different components) as $$WCQI_{A1}(r) = RPW_A(r) + CQI_{A1}(r) - P_{A1}(r) \times RP_{A1}(r) + RR_{A1}(r,t),$$

Where $WCQI_{A1}(r)$ is the weighted channel quality indicator for user $A_1$ on resource r, $RPW_A(r)$ is the resource priority weights for the serving cell A, $CQI_{A1}(r)$ is the CQI values for user $A_1$, $P_{A1}(r)$ is the power used by user $A_1$, and $RR_{A1}(r,t)$ denotes other resource usage restriction rules applicable for user $A_1$ at time t. In the above equation the components that are novel in this invention are underlined.

According to the invention the method of calculating the resource price that is provided by the eNB A to another interfering eNB B comprises the steps of (FIG. 7):

Assigning 701 cell specific resource priority weights (RPW) to each eNB, either in a cell planning step or by some other distributed or centralized method.

The first eNB A estimates 702 the current and the predicted short-term future load situation (Load$_A$).

Based on the load measure and the RPW the eNB A decides 703 which of the resources with the lowest priority weights it can provide with zero cost. The resource price provided from eNB A to the eNB B is based on truncating the resource priority weight function to a width proportional to the load of eNB A and scaling the area of the resulting function to a value proportional to the relative load ratio between eNB A and eNB B.

eNB A provides 704 the resource price.

I.e. the truncated resource priority weight of eNB A is a function f( ) of the RPW$_A$(r) and Load$_A$:

$$TRPW_A(r)=f(RPW_A(r), Load_A),$$

Thus, interference on resource blocks that are associated with zero cost is provided "for free" to all interfering base stations. The resource cost that the eNB A provides to the interfering eNB B is then another function g( ) of the TRPW$_A$(r) and Load$_A$/Load$_B$:

$$RP_{A,B}(r)=g(TRPW_A(r), Load_A/Load_B).$$

This means that the eNB may provide different resource prices to different interfering eNBs. This is believed to be of particular importance in case the load in the cellular network is un-evenly distributed among the cells.

Note that depending of the actual implementation of this invention the calculations that result in the resource price vector can be performed in either the disturbed or the disturbing base station.

Note also that in 3GPP the term "overload indicator" is currently used to indicate some kind of information related to inter-cell interference control sent between eNBs over the X2 interface. There are no decisions taken yet in 3GPP on what the "overload indicator" shall look like.

Figure 5:
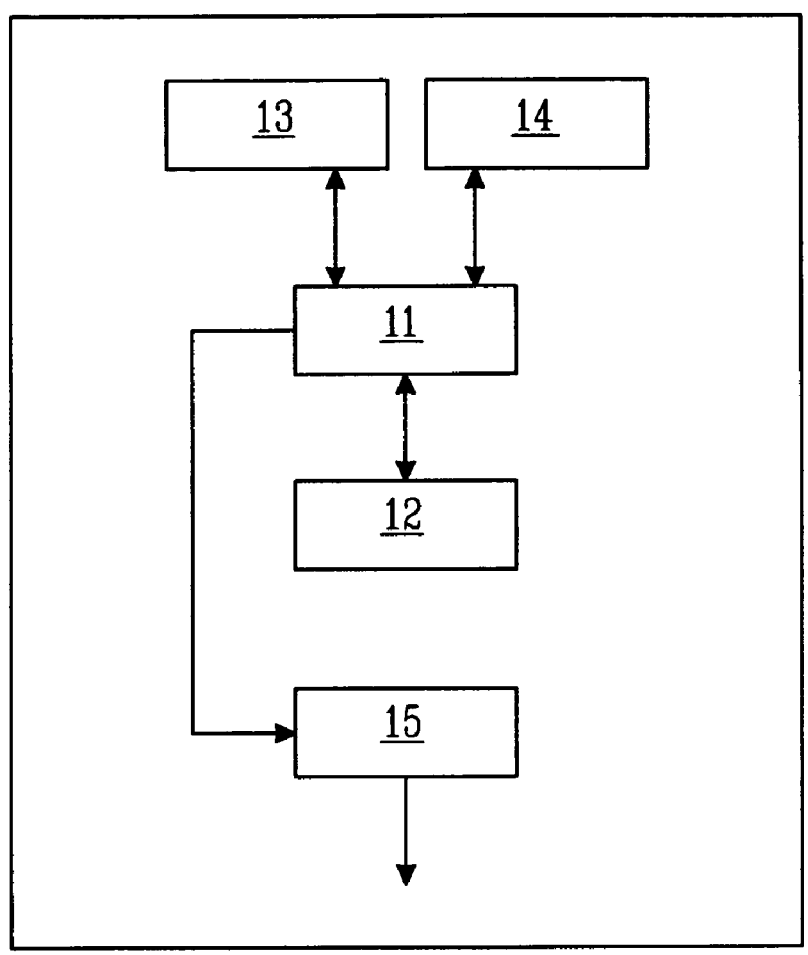
FIG. 5 is a block diagram of a base station according to one embodiment of the invention.

A base station 10 or part of the same according to the invention as illustrated in FIG. 5 and comprises:
- a portion 13 for receiving path gain measurements from at least one user, equipment to the interfered cells,
- a portion 14 for receiving cell specific resource price related information from one or several interfered base stations,
- an processing arrangement 11 for combining the information into a user specific resource price value for each radio resource,
- a calculating arrangement 12 for calculating a user specific weighted channel quality indication value for each radio resource, and
- means 15 for providing the scheduler with the user specific weighted CQI values.

Clearly, the base station comprises other functional elements for handling its functions well known for a skilled person but not illustrated here.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

REFERENCES

[1] 3GPP Standards Contribution, R1-072456, "On Intercell Interference Coordination Schemes without/with Load Indication", Ericsson, Kobe, Japan, May 2007.

[2] 3GPP Standards Contribution, R2-072577, "E-UTRA UE Measurement Reporting", Ericsson, Orlando, USA, June 2007.

[3] G. Li and H. Liu, "Downlink Radio Resource Allocation for Multi-cell OFDMA System", IEEE Transactions on Wireless Communications, Vol. 5, No. 12, December 2006.

[4] A. Abrardo, A. Alessio, P. Detti and M. Moretti, "Centralized Radio Resource Allocation for OFDMA Cellular Systems", IEEE International Conference on Communications (ICC '07), Glasgow, Scotland 2007.

[5] 3GPP Standards Contribution, R1-075014, "Way Forward on UL ICIC/Overload Indicator for LTE", Telecom Italia, Ericsson, Alcatel-Lucent, Orange, Qualcomm Europe, Telefonica, Vodafone, KPN, November 2007.

ABBREVIATIONS

EDGE Enhanced Data Rates for GSM Evolution
ICIC inter-cell interference coordination
LTE long-term evolution
OI overload indicator
OFDM Orthogonal frequency-division multiplexing
RP resource price
RPW resource priority weight
UE User equipment

The invention claimed is:

1. A base station for use in a communications network, in which a scheduler in each base station of said network controls a set of shared radio resources, said radio resources being at least near orthogonal to each other, said base station comprising:
- a communication circuit configured for receiving path gain measurements from at least one user equipment to at least one interfered base station;
- an interface circuit configured for receiving cell information related to a specific resource value from the at least one interfered base station, wherein the specific resource value is arranged to indicate a probability that a resource will be used, as well as an interference sensitivity on that particular resource;
- a processing arrangement for combining said cell information and said path gain measurements into a user specific resource value for each radio resource;
- a calculating arrangement for calculating a user specific weighted channel quality indication value for each radio resource, by combining a channel quality indication information available for each given user equipment with at least a product of the user specific resource value and a required transmit power for each user equipment; and
- wherein said scheduler of the base station is configured to use the user specific weighted channel quality indication values to make a scheduling decision.

2. A method in a base station for managing inter-cell interference in a communications network, comprising a scheduler in each cell which controls a set of shared radio resources, said radio resources being at least near orthogonal to each other, said method comprising:

obtaining data representing path gain measurements from at least one user equipment relative to at least one interfered base station;

obtaining data representing a cell specific resource price indicating a probability that a resource will be used as well as an interference sensitivity on that particular resource from the at least one interfered base stations;

combining said data representing said path gain measurements and said data representing a cell specific resource price into a user specific resource price value for each radio resource;

calculating a user specific weighted channel quality indication value for each radio resource by combining a channel quality indication information available for each given user equipment with at least a product of said user specific resource price value and a required transmit power for each user equipment; and making a scheduling decision based on said user specific weighted channel quality indication value.

3. The method of claim 2, further comprising combining cell specific resource priority weights and resource usage restriction rules into the user specific weighted channel quality indication values.

4. The method of claim 3, wherein said weighted channel quality indication (WCQI) value is expressed as:

$$WCQI_{A1}(r) = RPW_A(r) + CQI_{A1}(r) - P_{A1}(r) \times RP_{A1}(r) + RR_{A1}(r,t),$$

wherein $WCQI_{A1}(r)$ is the weighted channel quality indication value for a user $A_1$ on resource r, $RPW_A(r)$ is the resource priority weights for the serving cell A, $CQI_{A1}(r)$ is the channel quality indication information for user A1, $P_{A1}(r)$ is a power used by user A, and $RR_{A1}(r,t)$ denotes resource usage restriction rules applicable for said user A1 at time t.

5. A method to calculate a resource value indicating a probability that a resource will be used as well as an interference sensitivity on that particular resource that is provided by a first base station to an interfering second base station, the method comprising:

assigning cell specific resource priority weights (RPW) to each base station;

estimating a current and a predicted load situation ($Load_A$);

based on the current and the predicted load situation and said cell specific resource priority weights, deciding which of the resources with lowest priority weights said first base station can provide with zero value; and basing said resource value on truncating a resource priority weight function to a width proportional to the current and the predicted load situation of said first base station and scaling an area of a resulting resource priority weight function to a value proportional to a relative load ratio between said first base station and said second base station.

6. The method of claim 5, wherein said assignment of cell specific resource priority weights (RPW) to each base station is executed either in a cell planning step or by a distributed or centralized method.

7. The method of claim 5, wherein said truncating resource priority weight function (TRPW) of said first base station is a function, f, of said RPW and $Load_A$.

8. The method of claim 7, wherein interference on resource blocks that are associated with zero value is provided without resource consumption to one or several interfering base stations.

9. The method of claim 8, wherein said resource value that said first base station provides to said second interfering base station is a function (g) of said $TRPW_A$ and $Load_A/Load_B$, wherein $Load_B$ is a load of said second base station.

10. The method of claim 5, wherein said first base station provides different resource values to different interfering base stations.

11. A base station for use in a multi-cell environment, comprising:

a transmitter for transmitting a calculated resource value to at least one other base station; and one or more base station processing circuits configured to:

calculate said resource value as indicating a probability that a resource will be used as well as an interference sensitivity on that particular resource;

calculate a cost, indicating interference caused to neighboring base stations during transmission from a user equipment, of using its own resources based on at least one received resource value; and minimize the base station's own total cost of resource usage via a scheduling arrangement governing resource usage by the base station.

* * * * *

UNITED STATES PATENT AND TRADEMARK OFFICE
CERTIFICATE OF CORRECTION

PATENT NO. : 8,229,451 B2  
APPLICATION NO. : 12/598134  
DATED : July 24, 2012  
INVENTOR(S) : Frenger et al.

Page 1 of 1

It is certified that error appears in the above-identified patent and that said Letters Patent is hereby corrected as shown below:

On the Title Page, in Item (22), under "PCT Filed", in Column 1, Line 1, delete "Jan. 10, 2008" and insert -- Jan. 11, 2008 --, therefor.

On the Title Page, in Item (56), under "OTHER PUBLICATIONS", in Column 2, Line 5, delete "Co-oridination/Avoidcance" and insert -- Co-ordination/Avoidance --, therefor.

In the Drawings

Figure 7:
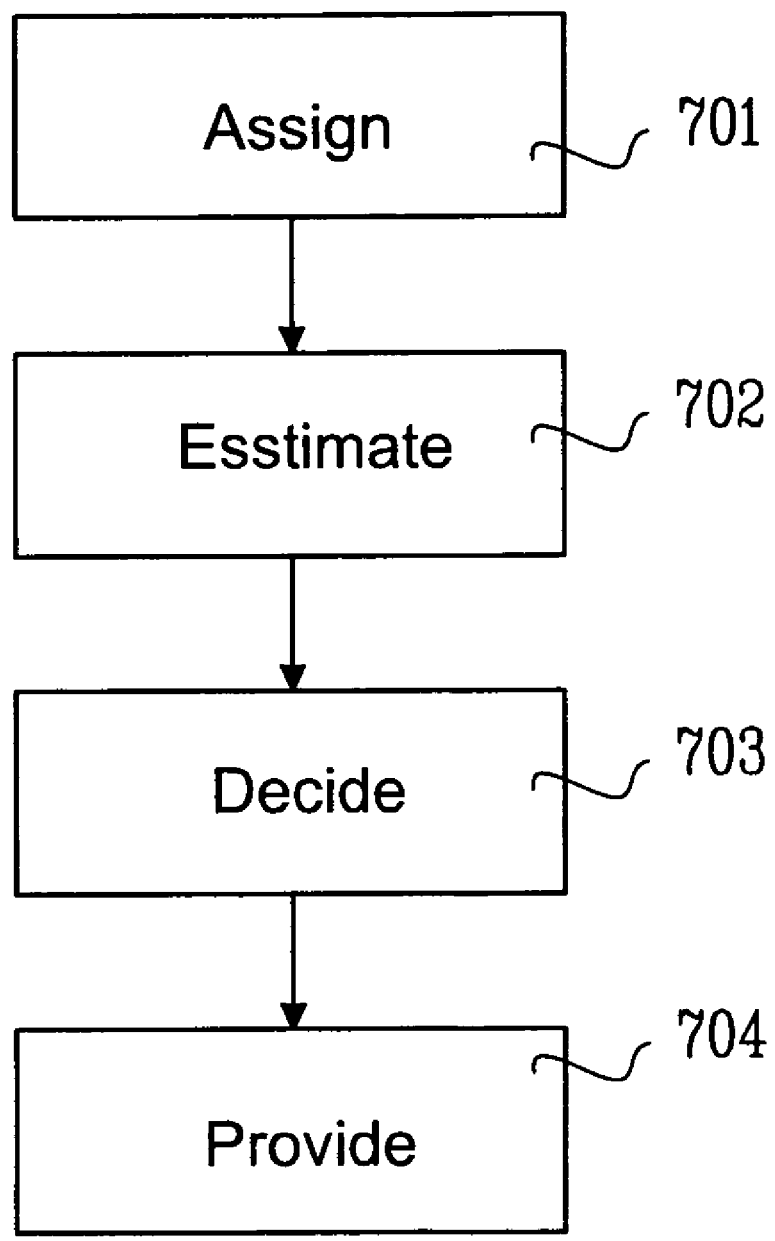
FIG. 7 is a schematic flow diagram illustrating steps of a calculation method according to the present invention.

In Fig. 7, Sheet 7 of 7, for Tag "702", in Line 1, delete "Esstimate" and insert -- Estimate --, therefor.

In the Specifications

In Column 3, Line 20, delete "(TRWP)" and insert -- (TRPW) --, therefor.

In Column 9, Line 42, delete "user," and insert -- user --, therefor.

Signed and Sealed this  
Sixth Day of May, 2014

Michelle K. Lee  
*Deputy Director of the United States Patent and Trademark Office*